United States Patent Office 3,451,851
Patented June 24, 1969

3,451,851
NEGATIVE ZINC ELECTRODES FOR SECONDARY CELLS
Douchan Stanimirovitch, Paris, France, assignor to Societe des Accumulateurs Fixes et de Traction (Societe Anonyme) Romainville, Seine-St-Denis, France, a company of France
No Drawing. Filed Dec. 27, 1966, Ser. No. 604,618
Claims priority, application France, Dec. 28, 1965, 44,024
Int. Cl. H01m 43/02, 13/06, 9/04
U.S. Cl. 136—30   16 Claims

ABSTRACT OF THE DISCLOSURE

The disclosure relates to negative zinc electrodes for secondary cells, preferably of the alkaline type and to means for counteracting zinc proliferation or treeing as well as zinc passivation simultaneously during cyclic charging and discharging of such cells to increase the useful life by the use of finely divided zinc powder as the active material of the negative zinc electrode and of jellifying and swelling agents or products directly incorporated into the zinc powder prior to its application as a paste to a carrier, for example, or by incorporation of other types of swelling agents or products into the zinc powder via the electrolyte of the cells by addition thereof to such electrolyte, or by both procedures. Various additives having required jellifying and/or swelling effect are disclosed, as are various methods of incorporation of such additives or agents. Naphthol compounds are included.

RELATED APPLICATION

A related application assigned to the same assignee as this application in the name of Jean Firmin Jammet Ser. No. 611,201, filed Dec. 22, 1966, and entitled, Manganese Dioxide-Zinc Alkaline Secondary Cell, is currently pending.

BRIEF SUMMARY OF INVENTION

This invention relates a negative zinc electrodes more especially to those used in alkaline secondary batteries.

Many solutions have already been considered and suggested in order to manufacture zinc electrodes that will operate satisfactorily in silver-zinc or nickel-zinc alkaline cells. As a matter of fact, zinc electrodes with good performance characteristics are chiefly desirable for the following reasons. Their potential in alkaline solution is strongly electronegative, being about 1.2 volts. Their specific capacity is very high since a zinc atom whose atomic weight is 65.37, reacts as a two valency (bivalent) element in oxidation reduction processes during cell charge or during discharge. Lastly, zinc metallurgy is technically very advanced so that a very pure raw material can be obtained at a low cost.

Two types of oxidation reduction reactions may be specified for zinc, whether they relate to zinc hydroxide or to zincates, viz:

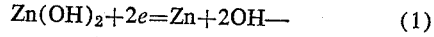

$$Zn(OH)_2 + 2e = Zn + 2OH^- \quad (1)$$

at a standard oxidation-reduction potential of —1.245 volts

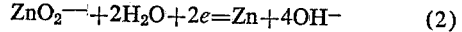

$$ZnO_2^{--} + 2H_2O + 2e = Zn + 4OH^- \quad (2)$$

at a standard oxidation reduction potential of —1.216 volts.

Reaction 1 may take place when the discharged or oxidized phase has the form of zinc hydroxide, while reaction 2 may occur when zincate is the only form of oxidized zinc which is then soluble.

Though many studies have been made on the subject, all of these come up against two main difficulties, still not satisfactorily solved, one related to the charging process and the other to the discharge process.

The first difficulty, related to the charging process lies in the pronounced tendency of zinc to "tree," i.e., grow in the shape of needles or dendrites, proliferating more and more as charging cycles are repeated, so that such proliferations or extensions ultimately extend to and reach the adjacent positive electrodes, building up short circuit bridges which as a result impair the cell life and finally destroy it.

The second difficulty related to the discharge process is due to the fact that zinc electrodes have an unfortunate tendency to become gradually passive, so that the available electrode capacity decreases with the successive discharges thereof.

A zinc cell fails, either because of short circuits due to zinc growth or "treeing" or for lack of capacity.

It will be shown hereafter that the two phenomena are not independent.

The principal solutions heretofore suggested for providing against the effect of zinc growth or treeing during charging may be summed up as follows:

(A) Use of separators having a special structure which cannot be passed through by zinc needles or dendrites or proliferations. Such separators comprise at least one layer of a semipermeable membrane, e.g., of sheets or regenerated cellulose, or polyvinyl alcohol films. The protection thus obtained, however, is only temporary, since though separators comprising said semipermeable sheets prevent zinc diffusion and as a consequence the spontaneous growth of needles, the zinc proliferation or treeing which still occurs in the cathodic compartment exert a mechanical action, increasing with time, on the semipermeable separators and they are eventually pierced or perforated by such proliferations, needles or dendries which then come into short circuit contact with an adjoining positive electrode. Thus, any short circuits are merely delayed but certainly not prevented.

(B) It has been suggested further that the cause of proliferation could be suppressed if the zinc electrode operated according to Reaction 1 above, i.e., remaining insoluble, so that its structure would not change during the reaction. Theoretically, thus the zinc cannot be dissolved when it is oxidized during discharge if the electrolyte is already saturated with zincate, so that no further amount of zincate can be formed, and if the volume of zincate saturated electrolyte is reduced. Experience has shown that improvements have thus been obtained, but that the cause of the formation of zinc needles, proliferations, dendrites or trees was not suppressed since such needles or the like were still formed. The cause of failure lies in the existence of numerous allotropic varieties of zinc oxide and hydroxide in different hydration states and with different solubility coefficients, so that probably in some places oxidized zinc may dissolve and later precipitate again during the charging process and proliferate.

(C) It has also been suggested to provide separators with reducible bodies forming electrochemical couples with the zinc needles as they form which latter are thus oxidized and, therefore, destroyed as they come into contact with the said reducible bodies. But this kind of protective action is only temporary since it only will exist as long as reducible bodies are present in the separator. As soon as these bodies are reduced, no electro-chemical couple can be formed any longer, so that zinc needles or dendrites or the like formed thereafter can no longer be oxidized in the separator.

This review of the principal solutions which have heretofore been suggested has been given for the purpose of showing how complex the problem is and for which either an efficient or lasting solution has not heretofore been found.

As to zinc passivation, it has also been recommended either to amalgamate the zinc or to maintain it in contact with a sheet made of a more electropositive metal, e.g., copper. However, such attempts alone have had only limited favorable effects. Of course, combinations of the various means hereabove mentioned have also been attempted, but no lasting improvements have heretofore been obtained.

The principal object and feature of this invention is to provide means which not only effectively temporarily suppress the cause of zinc proliferation and prevent zinc passivation, but also maintain such favorable conditions for a long period of time so that the useful life of the cells or batteries involved can be increased very effectively.

Other objects and features of the invention will become apparent from the following detailed description:

DETAILED DESCRIPTION OF INVENTION

This invention is based on the fact that the best condition for preventing zinc proliferation lies in operating at very low actual curent densities. It has been observed that zinc needles or trees or dendrites are formed whenever the actual current density between electrodes is increased during the charge, either on the whole surface area of the electrode, or locally. As soon as such a needle or dendrite is formed, due to the point effect of its electrical field, its tendency to grow keeps increasing because the actual current density along the initial forming sites increases, even if a very finely divided zinc, such as zinc powder has been initially used. The initial use of finely divided zinc constitutes a first feature and means for practicing the present invention. This means, however, is not sufficient by itself, as practice has shown, because the initial very favorable structure of the very divided zinc ordinarily is not preserved during operation. It has been observed that zinc tends to agglomerate and to coalesce, the effects of this phenomenon being well known under the name of zinc passivation. As the zinc agglomerates, its active surface decreases by becoming coated with a more or less permeable oxidized film which stops the progress of discharge. This agglomeration results in a correlative increase of the actual current density. As soon as this current density is increased, favorable conditions are created for zinc proliferation. Therefore, it is necessary also simultaneously to counteract zinc passivation.

According to this invention, a second or complementary means and feature of this invention has been developed by investigations on the relationship between zinc passivation and zinc proliferation, the said second or complementary means comprising adding to the zinc electrode products or agents which prevent the agglomeration or coalescence of zinc crystals, probably on account of their surface action. Due to such added products or agents, the initial finely divided state of zinc is preserved during the successive charging and discharging processes or cycles. Provided that the initial divided state of the zinc is fine enough, a very large active surface area will be maintained during practically the entire cell life. Therefore, the actual current density will always be kept low, which, as noted above, is a necessary condition for preventing zinc proliferation.

By the combination of both above-mentioned means or features which constitute the essence of this invention, the zinc passivation resulting from successive discharges and the zinc proliferation due to the corresponding charges can both be practically avoided.

Such added products or agents having an anticoalescent or antiagglomerating effect on zinc are composed of certain gels essentially producing a swelling effect. Suitable agents are described below.

Various cellulosic derivatives such as carboxymethylcellulose, methylcellulose, hydroxyethylcellulose, or hydroxymethylcellulose, are examples of these added products or agents and also starches such as potato starch, or corn starch or rice starch or the like, alginates or alginic acid derivatives, lignous products such as lignin, soluble resins such as carboxylvinyl polymers, polyvinyl alcohol derivatives, preferably characterized by a low viscosity factor, or compounds yielding a polyvinyl alcohol by hydrolysis or saponification, such as polyvinyl acetate.

Some of these agents are naturally occurring materials and others are synthetic.

The weight ratio of the said added products or agents as compared to the active electrode material, i.e., finely divided zinc corresponds generally to a few percent. This ratio can even be lower when synthetic added agents are used, and can be under 1%. It should be higher, e.g., up to 5% or 10%, with starches, for example.

Good resutls have been obtained with such added swelling agents, the ratio being less than 10% of the active electrode material weight.

To a certain extent, the effect of such jellifying and swelling agents may be explained by noting that the separators commonly used are semipermeable and comprise regenerated cellulose sheets, for example, which tend to swell in alkaline electrolyte. If such semipermeable separators also comprise a porous and, therefore, capillary material, this material will also have a tendency to swell in the electrolyte as a formation thereon or therein of zinc deposit from zincate occurs during charging.

The swelling effect of the separator will then lead more particularly to a strong compression of the negative electrode's active material. This strong compression will tend to decrease the total active surface area available to the electrochemical exchanges of charge and discharge and as a consequence the actual current density will correlatively increase especially during the charge. Conditions favorable to a proliferation of zinc needles can thus be created.

If, however, as contemplated by this invention, the zinc electrode constituted of very fine powder also comprises a jellifying and swelling agent, this agent by jellifying and swelling will effectively counteract the compression of the electrodes exerted by the swelling of the separator components, so that their effect will be reduced.

Further, the addition of jellifying and swelling agents to the very fine zinc powder may also create a surface tension between the zinc crystals preventing their growth. It is also possible that the said agents promote the formation of a great number of crystal nuclei, which ensure a very fine structure of the zinc deposit with large active surface area during charging.

In some cases it may even be advantageous when the pressure exerted by swelling separators is rather low, to provide swelling additives or agents all in the electrolyte itself, the said electrolyte itself already comprising potassium zincate, for example. Such additives, of a kind similar to those included in the negative electrode when it is being made, have essentially the effect of promoting the formation of many crystal nuclei during charging. Thus, a finer structure can be obtained.

With the use of such additives in the electrolyte itself, it may no longer be necessary to add swelling agents to the electrodes during their preparation. It it thus possible to use electrodes derived from known electrolytic processes while remaining in the scope of the invention.

For the said purpose, swelling compounds or agents as additives may be added to the electrolyte being, for example, naphtol compounds such as $\beta$-naphtol containing naphtol-S-yellow, or $\beta$-naphtol with diphenylamine and thymol, or 2-naphtol-6-sulfonic acid, or the like. The concentration of these additives can be in the range of 0.1 to 1 part per thousand by volume.

Naturally, additives of both kinds hereinbefore mentioned can be simultaneously used, viz, in the active electrode material and in the electrolyte.

Still within the scope of the invention, the electrodes may be made in several ways. For example, an electrode can be prepared using a paste made from a dry mix of zinc powder of the required grain size (for instance, capable of passing through 60 to 100 mesh sieves) with 5% by weight of potato starch, for example, and water. Advantageously, the zinc powder used in preparing the paste may be previously amalgamated.

A metallic carrier of, for example, expanded zinc, zinc screen or mesh, perforated zinc sheet or the like is then coated with a layer of this paste on one or both sides to produce a zinc electrode of desired thickness.

The composition presented below of this paste in approximate proportions as mentioned has given good results:

Water _____ml__ 100
Amalgamated zinc powder _____g__ 100
Potato starch _____g__ 8

Such a formula is given as an example only, but in no way limitative an may be modified in various ways without departing from the scope of this invention. More especially, other "swelling agents" than those mentioned hereabove may be used.

It is also obvious that this invention applies to any type of secondary cell using a negative zinc electrode.

While specific embodiments of the invention have been presented herein, variation within the scope of the appended claims are possible and are contemplated. There is no intention, therefore, of limitation to the exact disclosure herein made.

I claim:

1. A negative electrode for a secondary alkaline cell comprising zinc active material intimately in contact with agents which prevent agglomeration and coalescence of zinc crystals formed during charging, said agents being capable of creating surface tension between zinc crystals which tend to form and grow and inhibiting such growth said agents being selected from the group consisting of naphthol compounds comprising $\beta$-naphtol containing naphtol-S-yellow, $\beta$-naphtol with diphenylamine and thymol, and -2-naphtol-6-sulphonic acid.

2. A negative electrode for a secondary cell according to claim 1, wherein a jellifying agent also is present in the electrode in a weight ratio to the active zinc ranging up to 10% thereof.

3. A negative electrode for a secondary cell according to claim 1, wherein a jellifying agent which is a naturally occurring substance also is present in the electrode in a weight ratio to the active zinc ranging up to a few percent.

4. A negative electrode for a secondary cell according to claim 1, wherein a jellifying agent which is a synthetic substance also is present in the electrode in a weight ratio of approximately 1%.

5. A negative electrode for a secondary cell according to claim 1, wherein said active material is zinc in initially divided state and of very finely sized powder grains.

6. A negative electrode for a secondary cell according to claim 5, wherein said zinc active material is in initially finely divided state and is amalgamated.

7. A negative electrode for a secondary cell according to claim 5, wherein said powder grains are capable of passing through approximately 60–100 mesh sieves.

8. A negative electrode for a secondary cell according to claim 1, comprimising a metallic support coated on at least one face with a paste layer comprising said zinc active material in finely divided state and said agents.

9. A negative electrode for a secondary cell according to claim 8, wherein said support is of zinc.

10. A negative electrode for a secondary cell according to claim 8, wherein said support is of expanded zinc containing metal.

11. A negative electrode for a secondary cell according to claim 8, wherein said support is a metallic zinc-containing screen.

12. A negative electrode for a secondary cell according to claim 8, wherein said support is a perforated zinc-containing metal plate.

13. A negative electrode for a secondary cell according to claim 8 in which each face of said support is coated with a paste layer.

14. A negative electrode for a secondary cell according to claim 1, wherein the said agents are included as additives in the said electrolyte which is impregnated into said electrode.

15. A negative electrode for a secondary cell according to claim 14, wherein said electrolyte additives are soluble $\beta$-naphtol compounds whose concentration in said electrolyte ranges from approximately 0.1 to 1 part per thousand by volume.

16. A method of preparing a negative zinc containing electrode for a secondary alkaline cell comprising providing electrolyte and agents which prevent agglomeration and coalescence of zinc crystals formed during charging by creating surface tension between zinc crystals, into contact with said electrode, by incorporating therein soluble beta-naphtol compounds, said beta-naphtol compounds comprising beta-naphtol containing naphtol-S-yellow, beta-naphtol with diphenylamine and thymol, and 2-naphtol-6-sulphonic acid, the naphtol compounds being added to the electrolyte in proportions of from approximately 0.1 to 1 part per thousand by volume of the electrolyte.

References Cited

UNITED STATES PATENTS

| | | | |
|---|---|---|---|
| 2,692,904 | 10/1954 | Strauss | 136—30 |
| 2,708,683 | 5/1955 | Eisen | 136—20 |
| 2,820,077 | 1/1958 | Salauze | 136—21 |
| 2,931,846 | 4/1960 | Cunningham et al. | 136—30 |
| 2,987,567 | 6/1961 | Freas et al. | 136—30 |
| 3,042,732 | 7/1962 | Kordesch | 136—30 |
| 3,056,849 | 10/1962 | Warren et al. | 136—125 |
| 3,060,254 | 10/1962 | Urry | 136—30 |
| 3,198,668 | 8/1965 | Schneider | 136—130 |

ALLEN B. CURTIS, Primary Examiner.

C. F. LEFEVOUR, Assistant Examiner.

U.S. Cl. X.R.

136—125, 157